United States Patent
Souza Bento et al.

(10) Patent No.: US 12,378,395 B2
(45) Date of Patent: Aug. 5, 2025

(54) POLYPROPYLENE-BASED COMPOSITIONS INCORPORATING POST-CONSUMER RESIN AND METHODS THEREOF

(71) Applicant: Braskem S.A., Camaçari (BR)

(72) Inventors: Leonardo Souza Bento, São Paulo (BR); Leandro de Castro Tomasi, São Paulo (BR); Andre Trevisan Bertolotti, São Paulo (BR)

(73) Assignee: Braskem S.A., Camacari (BR)

( * ) Notice: Subject to any disclaimer, the term of this patent is extended or adjusted under 35 U.S.C. 154(b) by 533 days.

(21) Appl. No.: 17/800,810

(22) PCT Filed: Feb. 18, 2021

(86) PCT No.: PCT/IB2021/020006
§ 371 (c)(1),
(2) Date: Aug. 18, 2022

(87) PCT Pub. No.: WO2021/165751
PCT Pub. Date: Aug. 26, 2021

(65) Prior Publication Data
US 2023/0074665 A1 Mar. 9, 2023

Related U.S. Application Data

(60) Provisional application No. 62/978,094, filed on Feb. 18, 2020.

(51) Int. Cl.
*C08L 23/10* (2006.01)
*C08L 23/12* (2006.01)

(52) U.S. Cl.
CPC ......... *C08L 23/12* (2013.01); *C08L 2205/025* (2013.01); *C08L 2207/02* (2013.01); *C08L 2207/20* (2013.01)

(58) Field of Classification Search
None
See application file for complete search history.

(56) References Cited

U.S. PATENT DOCUMENTS

| 2013/0095542 A1 | 4/2013 | Pereira et al. |
| 2018/0237625 A1 | 8/2018 | Trenor et al. |
| 2022/0177681 A1* | 6/2022 | Briggs ............... C08L 23/12 |

FOREIGN PATENT DOCUMENTS

| EP | 3165473 A1 | 5/2017 | |
| WO | WO-2019224129 A1 * | 11/2019 | ............ C08L 23/10 |

OTHER PUBLICATIONS

International Search Report issued in International Application No. PCT/IB2021/020006, mailed Jun. 10, 2021 (4 pages).
Written Opinion issued in International Application No. PCT/IB2021/020006, mailed Jun. 10, 2021 (6 pages).

* cited by examiner

*Primary Examiner* — Richard A. Huhn
(74) *Attorney, Agent, or Firm* — Traister LLC; Patrick Traister

(57) ABSTRACT

A polymer composition may include from 10 to 90 wt. % of at least a virgin polypropylene resin selected from a group consisting of propylene homopolymers, propylene random copolymers, propylene heterophasic copolymers and combinations thereof; and from 10 to 90 wt. % of at least a recycled resin; wherein the polymer composition presents a Melt Flow Rate from 1 to 50 g/10 min measured according to ASTM D1238 (2.16 kg/230° C.), Flexural Modulus at 1% secant measured according to ASTM D790 from 900 to 1700 MPa and a Izod Impact Resistance at 23° C. measured according to ASTM D256 from 15 to 400 J/m.

21 Claims, No Drawings

POLYPROPYLENE-BASED COMPOSITIONS INCORPORATING POST-CONSUMER RESIN AND METHODS THEREOF

This application is a national stage entry under 35 U.S.C. § 371 of International Application No. PCT/IB2021/020006 filed 18 Feb. 2021, which claims priority to U.S. provisional application No. 62/978,094 filed on 18 Feb. 2020. The entire contents of these applications are explicitly incorporated herein by this reference.

BACKGROUND

Polyolefins such as polyethylene (PE) and polypropylene (PP) may be used to manufacture a varied range of articles, including films, molded products, foams, and the like. Polyolefins may have characteristics such as high processability, low production cost, flexibility, low density and recycling possibility. While plastics such as polyethylene and polypropylene have many beneficial uses, production and manufacture of plastics and plastic articles often impacts the environment in detrimental ways including trash production and increased emission of $CO_2$ during processing.

One of the largest challenges faced by society today is to reduce greenhouse gas emissions in order to minimize the impact on the climate and environment. International agreements such as the Paris Agreement of 2015 may set limits on $CO_2$ emissions and drive the transition to a low carbon economy based on renewable energy, in addition to the development of new economic and business models. In some cases, new production techniques and material solutions may be used to reduce the carbon footprint during plastic manufacture, and a life cycle perspective may be applied to weight the possible trade-offs between material functionality and environmental impact.

Another great challenge of the society is to rethink the use of plastics in order to reduce the environmental impact of the waste residues. One of the options is to mechanically recycle the consumed plastic to reintroduce it in the plastic value chain. Post-consumer resins (PCR) are available in the market, but because of the high inhomogeneity of sources and the chemical and mechanical damages that the plastic suffers in its entire chain (from the production to the waste), the properties of those resins are generally poor, being a challenge to reuse them in many applications that require high property standards.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a polymer composition that includes from 10 to 90 wt. % of at least a virgin polypropylene resin selected from a group consisting of propylene homopolymers, propylene random copolymers, propylene heterophasic copolymers and combinations thereof; and from 10 to 90 wt. % of at least a recycled resin; wherein the polymer composition presents a Melt Flow Rate from 1 to 50 g/10 min measured according to ASTM D1238 (2.16 kg/230° C.), Flexural Modulus at 1% secant measured according to ASTM D790 from 900 to 1700 MPa and a Izod Impact Resistance at 23° C. measured according to ASTM D256 from 15 to 400 J/m.

In another aspect, embodiments disclosed herein relate to a method for preparing a molded article that includes dry blending the PCR and the virgin resin selected from polypropylene homopolymers, polypropylene random copolymers, polypropylene heterophasic copolymers or combinations thereof to form a polymer composition; and molding the article from the polymer composition, where the polymer composition includes from 10 to 90 wt. % of at least a virgin polypropylene resin selected from a group consisting of propylene homopolymers, propylene random copolymers, propylene heterophasic copolymers and combinations thereof; and from 10 to 90 wt. % of at least a recycled resin; wherein the polymer composition presents a Melt Flow Rate from 1 to 50 g/10 min measured according to ASTM D1238 (2.16 kg/230° C.), Flexural Modulus at 1% secant measured according to ASTM D790 from 900 to 1700 MPa and a Izod Impact Resistance at 23° C. measured according to ASTM D256 from 15 to 400 J/m.

In another aspect, embodiments disclosed herein relate to a method for preparing a molded article that includes melt blending the PCR and the virgin resin selected from polypropylene homopolymers, polypropylene random copolymers, polypropylene heterophasic copolymers or combinations thereof to form a polymer composition; and molding the article from the polymer composition, where the polymer composition includes from 10 to 90 wt. % of at least a virgin polypropylene resin selected from a group consisting of propylene homopolymers, propylene random copolymers, propylene heterophasic copolymers and combinations thereof; and from 10 to 90 wt. % of at least a recycled resin; wherein the polymer composition presents a Melt Flow Rate from 1 to 50 g/10 min measured according to ASTM D1238 (2.16 kg/230° C.), Flexural Modulus at 1% secant measured according to ASTM D790 from 900 to 1700 MPa and a Izod Impact Resistance at 23° C. measured according to ASTM D256 from 15 to 400 J/m.

In yet another aspect, embodiments disclosed herein relate to a molded article comprising the polymeric composition including from 10 to 90 wt. % of at least a virgin polypropylene resin selected from a group consisting of propylene homopolymers, propylene random copolymers, propylene heterophasic copolymers and combinations thereof; and from 10 to 90 wt. % of at least a recycled resin; wherein the polymer composition presents a Melt Flow Rate from 1 to 50 g/10 min measured according to ASTM D1238 (2.16 kg/230° C.), Flexural Modulus at 1% secant measured according to ASTM D790 from 900 to 1700 MPa and a Izod Impact Resistance at 23° C. measured according to ASTM D256 from 15 to 400 J/m, wherein the molded article is selected from pallets, boxes, appliance parts, appliance housing, automotive parts, batteries, wheel well guards, caps and closures.

Other aspects and advantages of the claimed subject matter will be apparent from the following description and the appended claims.

DETAILED DESCRIPTION

In one aspect, embodiments disclosed herein relate to polymer compositions and articles formed thereof that contain blended polymer compositions of polypropylene and a recycled resin such as post-consumer resin (PCR). As mentioned above, recycled resins such as post-consumer resins generally have high inhomogeneity of sources, and the properties of PCR are generally poor due to the chemical and mechanical damages that the plastic suffers from its production through discard. However, the present disclosure is directed to blended compositions of a recycled resin with a virgin polypropylene resin achieve desired properties.

Recycled Resin

In one or more embodiments, the recycled resin may be selected from a post-consumer resin (PCR), post-industrial resin (PIR), and/or regrind. PCR refers to resin that is recycled after consumer use thereof, whereas PIR refers to resin that is recycled from industrial materials and/or processes (for example, cuttings of materials used in making other articles). When the materials are recovered directly from the same manufacturing process, the materials may be referred to as regrind. In one or more embodiments, the PCR present in the one or more blended polymer compositions may be an polyolefin. Generally, PCR may include resins having been used in rigid applications (such as PCR from previously blow molded articles, normally from 3D-shaped articles) as well as in flexible applications (such as from films). In one or more particular embodiments, the PCR used in the one or more blended polymer compositions may include PCR originally used in rigid applications. For example, the PCR may be a polyolefin selected from polyethylene (such as HDPE, LDPE, LLDPE, MDPE, ULDPE, and UHDPE), polypropylene (such as homopolymers, random copolymers, and heterophasic copolymers), polybutylene, and polystyrene. In particular embodiments, the PCR may include at least 80 wt % formed of such polyolefins, such as, for example, at least 80 wt % of the PCR formed from polypropylene. The PCR used may be of any color, including but not limited to black, white, or grey, depending on the color used in the ultimate article.

In one or more embodiments, PCR may have a melt flow rate according to ASTM D1238 at 230° C./2.16 kg having a lower limit selected from any one of 5 g/10 min, 7 g/10 min, and 10 g/10 min to a upper limit selected from any one of 15 g/10 min, 20 g/10 min, 25 g/10 min, and 30 g/10 min, where any lower limit may be combined with any upper limit.

In one or more embodiments, PCR may have a flexural modulus at 1% secant, measured according to ASTM D790 greater than 900 MPa or in a range having a lower limit of any of 900, 950, or 1000 MPa, and an upper limit of any of 1050, 1100, or 1150 MPa, where any lower limit can be used in combination with any upper limit.

In one or more embodiments, PCR may have an Izod Impact Resistance at 23° C., measured according to ASTM D256 having a lower limit of 25 J/m, 30 J/m, or 35 J/m, and an upper limit of any of 45, 50, or 55 J/m.

Virgin Resin

The blended composition may include at least one virgin resin in combination with the PCR. The at least one virgin resin may be a polypropylene resin selected from propylene homopolymers, propylene random copolymers, propylene heterophasic copolymers and combinations thereof.

Propylene homopolymers include, for example, less than 1 wt % of a comonomer selected from ethylene, alpha-olefins having 4 to 8 carbon atoms, or combinations thereof. Propylene random copolymers include, for example from 1 to 6 wt % of a comonomer ethylene, alpha-olefins having 4 to 8 carbon atoms, or combinations thereof.

Propylene heterophasic copolymers (HECO) include a continuous phase and a dispersed phase, where the continuous phase may be either a propylene homopolymer or propylene random copolymer. The dispersed phase may be an elastomer present in amount ranging from a lower limit of any of 10, 15, or 20 wt. % to an upper limit of any of 25, 30, 35, or 40 wt. %, where any lower limit can be used in combination with any upper limit.

The elastomer phase of the heterophasic propylene copolymer may be, for example, an elastomeric copolymer. The elastomeric copolymer may be a propylene copolymer that comprises propylene and one or more comonomers. In one or more embodiments, the comonomers of the elastomeric copolymer may be one or more selected from a group consisting of ethylene, butene, and higher a-olefins. In particular embodiments, the comonomers may be selected from the group consisting of ethylene and butene. The elastomeric copolymer may comprise the one or more comonomers in an amount ranging from 20 to 70 wt. %, relative to the weight of the elastomeric copolymer. In one or more embodiments, the elastomeric copolymer may comprise the one or more comonomers in an amount ranging from a lower limit of any of 15, 20, 25, or 30 wt. % to an upper limit of any of 40, 50, 60, or 70 wt. %, where any lower limit can be used with any upper limit. In one or more embodiments, the elastomeric copolymer may have an intrinsic viscosity, measured according ASTM D445 in decaline at 135° C., having a lower limit of any of 0.5, 1.0, or 1.5 dl/g and an upper limit of any of 5, 6, or 7 dl/g, where any lower limit can be used with any upper limit.

The heterophasic propylene copolymer in accordance with the present disclosure may possess a xylene cold soluble content, measured according to ASTM D5492, that ranges from about 10 to 40 wt. %. For example, the heterophasic propylene copolymer may have a xylene cold soluble content having a lower limit of any of 10, 15, 18, 20, or 22 wt. % and an upper limit of any of 25, 30, 35, or 40 wt. %, where any lower limit can be used in combination with any upper limit.

The heterophasic propylene copolymer in accordance with the present disclosure may have a comonomer content ranging from 3 to 30 wt %. For example, the heterophasic propylene copolymer may have a comonomer content having a lower limit of any of 3, 5, or 8 wt %, and an upper limit ranging from any of 20, 25, or 30 wt %, where any lower limit can be used in combination with any upper limit.

While one or more embodiments may use a petrochemical virgin polypropylene resin in the blended polymer compositions, in one or more particular embodiments, the virgin resin may be bio-based. In particular embodiments using a blend of biobased resin and recycled resin, the blended composition may have a particularly low carbon emission (or even a carbon uptake) through the selection of the amounts of the two components in the blended composition.

Biobased polypropylenes in accordance with the present disclosure may include polyolefins containing a weight percentage of biologically derived monomers. Propylene monomers may be derived from similar biological processes as discussed above with respect to biobased polyethylene, and discussed, for example, in U.S. Pat. Pub. 2013/0095542. In one or more embodiments, biologically derived n-propanol may be dehydrated to yield propylene, which is then polymerized to produce various types of polypropylene. Biobased polypropylene in accordance with the present disclosure may include a homopolymer, random copolymer, heterophasic copolymer or terpolymer, and the like.

Biobased polypropylenes in accordance with the present disclosure may include a polypropylene having a biobased carbon content as determined by ASTM D6866-18 Method B at a percent in a range having a lower limit selected from any of 5%, 8%, 10%, and 20%, to an upper limit selected from any of 50%, 90%, and 100%, where any lower limit may be combined with any upper limit.

In one or more embodiments, biobased products obtained from natural materials may be certified as to their renewable carbon content, according to the methodology described in the technical standard ASTM D 6866-06, "Standard Test Methods for Determining the Biobased Content of Natural Range Materials Using Radiocarbon and Isotope Ratio Mass Spectrometry Analysis."

In one or more embodiments, virgin polypropylene may have a melt flow rate according to ASTM D1238 at 230° C./2.16 kg having a lower limit selected from any one of 1 g/10 min, 2 g/10 min, 5 g/10 min, and 10 g/10 min to an upper limit selected from any one of 50 g/10 min, 100 g/10 min, 125 g/10 min, and 150 g/10 min, where any lower limit may be combined with any upper limit. In particular, In one or more embodiments, virgin polypropylene may have a density according to ASTM D792 in a range having a lower limit selected from any one of 0.800 g/cm$^3$, 0.905 g/cm$^3$, 0.910 g/cm$^3$, 0.945 g/cm$^3$, and 0.950 g/cm$^3$ to an upper limit selected from any one of 0.945 g/cm$^3$, 0.955 g/cm$^3$, 0.963 g/cm$^3$, and 0.970 g/cm$^3$, where any lower limit may be combined with any upper limit.

In one or more embodiments, virgin polypropylene may have a flexural modulus at 1% secant, measured according to ASTM D790 in a range having a lower limit of any of 650, 750, 850, or 1000 MPa, and an upper limit of any of 1200, 1500, or 1700 MPa, where any lower limit can be used in combination with any upper limit.

In one or more embodiments, virgin polypropylene may have an Izod Impact Resistance at 23° C., measured according to ASTM D256 of at least 10 J/m, 20 J/m, or 30 J/m, including up to no break.

Blended Polymer Composition

As mentioned above, one or more of the blended polymer compositions includes a blend of virgin resin and recycled resin (such as PCR), and may be referred to as the blended polymer composition.

In one or more embodiments, blended polymer compositions, containing both virgin resin and recycled resin (such as PCR), may contain a percent by weight, based on the total composition (wt %) of the blend, a virgin polypropylene resin (which may optionally be biobased) ranging from a lower limit selected from one of 10 wt %, 20 wt %, 25 wt %, 30 wt %, 40 wt %, 45 wt %, and 50 wt % to an upper limit selected from one of 50 wt %, 55 wt %, 60 wt %, 70 wt %, 75 wt %, 80 wt %, and 90 wt % where any lower limit can be used with any upper limit. Further, it is envisioned that a polymer composition may optionally contain at least some quantity of biobased polypropylene (as the virgin resin) depending on the application and the desired carbon emission profile, discussed below.

In one or more embodiments, the blended polymer compositions may contain a percent by weight, based on the total composition (wt %) of the blend, a recycled resin (such as PCR) content ranging from a lower limit selected from one of 10 wt %, 20 wt %, 25 wt %, 30 wt %, 40 wt %, 45 wt %, and 50 wt % to an upper limit selected from one of 50 wt %, 55 wt %, 60 wt %, 70 wt %, 75 wt %, 80 wt %, and 90 wt % where any lower limit can be used with any upper limit. Generally, the present compositions seek to increase the amount of recycled resin content while also achieving desired composition properties. Thus, it is understood that the amount of virgin polymer can always be increased; however, the present compositions may maximize the recycled resin content and minimize the virgin resin content, while achieving the desired end properties for the blended compositions. Further, it is envisioned that a polymer composition may contain more or less PCR depending on the application and the desired carbon emission profile.

In one or more embodiments, methods of blended polymer composition manufacture may exhibit carbon emission close to zero mass equivalents of $CO_2$ per mass of polymer (i.e., kg $CO_2$/kg polymer). In some embodiments, the mass equivalents of $CO_2$ per mass of a polymer composition may be negative, indicating a carbon uptake (also referred as carbon sequestration) of $CO_2$ from the atmosphere. Blended polymer compositions in accordance with the present disclosure may include a mixture of a virgin (which may include an amount of biobased resin and a petrochemical resin) and a recycled polymer composition (such as PCR), where the amount of each component is selected based on the calculated carbon footprint as determined by an "Emission Factor" calculated as shown in Eq. 1:

$$P1_{Biobased} \cdot \text{Emission factor}_{P1Biobased} + P2_{Recycled} \cdot \text{Emission factor}_{P2Recycled} + P3_{Petro} \cdot \text{Emission factor}_{P3Petro} = \text{Emission factor}_{blend};$$

wherein $P1_{Biobased}$ is the weight percentage of the virgin biobased polypropylene, $P2_{Recycled}$ is the weight percent of the PCR, $P3_{Petro}$ is the weight percent of the virgin petrochemical based polypropylene; Emission factor$_{P1Biobased}$ is the calculated emission for the virgin biobased polypropylene in kg $CO_2$/kg PP, Emission factor$_{P2Recycled}$ is the calculated emission for the PCR in kg $CO_2$/kg PP, Emission factor$_{P3Petro}$ is the calculated emission for the virgin petrochemical based polypropylene, and Emission factor$_{Blend}$ is the calculated emission for the polymer composition in kg $CO_2$/kg polymer composition. In one or more embodiments, the wt % of each component is selected such that the polymer composition exhibits an Emission Factor$_{Blend}$ of less than or equal to 1.0 kg $CO_2$/kg polymer composition, as determined according to the aforementioned formula. In one or more embodiments, the blended composition may have an Emission Factor$_{Blend}$ in the range of −1 to 1 g $CO_2$/kg polymer composition. While a range of Emission Factors are presented, it is envisioned that the Emission Factor may be approximately 0 or less negative than −1 in some embodiments, depending on the available starting materials and application requirements of the final polymer composition. For example, in one or more embodiments, the Emission Factor may have a lower limit of any of −1.0, −0.8, −0.6, −0.4, −0.2 or −0.1, and an upper limit of any of 0.1, 0.2, 0.4, 0.6, 0.8, or 1.0, where any lower limit can be used in combination with any upper limit.

As disclosed herein, the Emission Factor of polymer compositions may be calculated according to the international standard ISO 14044:2006—"ENVIRONMENTAL MANAGEMENT—LIFE CYCLE ASSESSMENT—REQUIREMENTS AND GUIDELINES". The boundary conditions consider the cradle to gate approach. Numbers are based on peer reviewed LCA ISO 14044 compliant study and the environmental and life cycle model are based on SimaPro® software. Ecoinvent is used as background database and IPCC 2013 GWP100 is used as LCIA method.

Upon blending the PCR and virgin resin, in one or more embodiments, the blended polymer composition may have a melt index measured according to ASTM D1238 at 230° C./2.16 kg ranging from 1 to 50 g/10 min. In particular, the melt index may have a lower limit ranging from any of 1, 2, 3, 5, 6, 8, or 10 g/10 min to an upper limit of any of 25, 30, 35, 40, 45, or 50 g/10 min, where any lower limit can be used in combination with any upper limit.

In one or more embodiments, the blended polymer composition may include at least one additive selected from antioxidants, optical brightener, processing aids, coloring agents, internal plasticizers, external plasticizers, nucleating agents, blowing agents, superficial modifiers, neutralizing agents, and anti-static agents. For example, in one or more particular embodiments, the blended polymer composition may include at least 100 ppm of at least one antioxidant selected from phenolic, aminic, phosphite, thioester, sulphur based and combinations thereof. In one particular embodiment, the antioxidants may be selected from tetrakis(methylene(3,5-di-tert-butyl-4-hydroxy-hydrocinnamate))methane, 1,3,5-Trimethyl-2,4,6-tris(3,5-di-tert-butyl-4-hydroxybenzyl) Benzene, Tris(2,4-di-tert-butylphenyl) phosphite, Bis(2,4-di-t-butylphenyl) Pentaerythrtol Diphosphite, Ditridecyl thiodipropionate, Oxidized bis (hydrogenated tallow alkyl) amines, Pentaerythrityl-tetrakis(3-(3',5'-di-tert. butyl-4-hydroxyphenyl)-propionate; 1,3,5-trimethyl-2,4,6-tris-(3,5-di-tert. butyl-4-hydroxyphenyl) benzene, 1,3,5-Tris(3',5'-di-tert. butyl-4'-hydroxybenzyl)-isocyanurate), Di-stearyl-thio-di-propionate, Di-lauryl-thio-di-propionate; Di-octadecyl-disulphide, Pentaerithrityl-tetrakis(3-(3',5'-di-tert.butyl-4-hydroxyphenyl)-propionate), Octadecyl-3-(3',5'-ditert.butyl-4-hydroxyphenyl)-propionate), Bis(2,4-di-tert.butylphenyl)-pentaerithrityl-di-phosphite, Tetrakis[methylene-3-(3',5'-di-t-4-hydroxyphenyl) propionate]methane, n-octadecynyl-3-(4'-hydroxynyl)propionate, and combinations thereof. Further, in one or more embodiments, the blended polymer contains at least 100 ppm or a primary antioxidant (e.g. hindered phenols or secondary aromatic amines) and at least 100 ppm of a secondary antioxidant (e.g. phosphites).

Further, in one or more particular embodiments, the blended polymer composition may include at least 50 ppm of at least a neutralizing agent selected from stearates (e.g. calcium stearate) or Magnesium Aluminum Hydroxy Carbonate Hydrate.

Further, as mentioned above, the PCR may be black, white or grey, and selection from these colors may depend on the color in the end use article. The desired color may optionally be achieved by use of a masterbatch of a pigmented composition (containing, for example, pigment in a vehicle resin including but not limited to polyolefins (PE, PP, or combinations thereof)) that is added with the virgin resin and the recycled resin in the blended polymer composition. It is also envisioned that color masterbatches may be added depending on the application, for example, in an amount that is greater than 1.0 wt % (solid or liquid).

The blended polymer composition may be formed by blending (such as by dry blending or melt blending) PCR with a virgin polypropylene resin (optionally biobased), and in particular embodiments, the amounts selected for blending may be selected based on consideration of reduction of $CO_2$ emissions, as described above to have an Emission Factor less than or equal to 1.0 kg $CO_2$/kg of the blended polymer composition. It is also envisioned that the polymer composition may be formulated as a masterbatch formulation that may be diluted in a subsequent melt-blend or dry blend process to form the final polymer composition having the improved properties.

Solubilization

Polymer compositions in accordance with the present disclosure may be prepared from the constituent components using a number of techniques. In one or more embodiments, a virgin resin and PCR may be solubilized in a suitable organic solvent such as decalin, 1,2-dichlorobenzene, 1,1,1,3,3,3-hexafluor isopropanol, and the like. The solvent mixture may then be heated to a temperature, such as between 23° C. and 130° C., under stirring to blend the polymers Extrusion In one or more embodiments, polymer compositions in accordance with the present disclosure may be prepared using continuous or discontinuous extrusion. Methods may use single-, twin- or multi-screw extruders, which may be used at temperatures ranging from 100° C. to 270° C. in some embodiments, and from 140° C. to 230° C. in some embodiments. In some embodiments, raw materials are added to an extruder, simultaneously or sequentially, into the main or secondary feeder in the form of powder, granules, flakes or dispersion in liquids as solutions, emulsions and suspensions of one or more components.

Methods of preparing polymer compositions in accordance with the present disclosure may include the general steps of combining one or more virgin resins and PCR in an extruder; melt extruding the one or more virgin resins and the PCR as a blended polymer composition; and forming pellets, films, sheets or molded articles from the blended polymer composition. In one or more embodiments, methods of preparing polymer compositions may involve a single extrusion or multiple extrusions following the sequences of the blend preparation stages.

In one or more embodiments, polymer composition components can be pre-dispersed prior to extrusion using intensive mixers, for example. Inside an extrusion equipment, the components are heated by heat exchange and/or mechanical friction, the phases are melt and the dispersion occurs by the deformation of the polymer. In some embodiments, one or more compatibilizing agents (such as a functionalized polyolefin) between polymers of different natures may be used to facilitate and/or refine the distribution of the polymer phases and to enable the formation of the morphology of conventional blend and/or of semi-interpenetrating network at the interface between the phases.

In one or more embodiments, extrusion techniques in accordance with the present disclosure may also involve the preparation of a polymer composition concentrate (a masterbatch) that is then combined with other components to produce a polymer composition of the present disclosure.

Polymer compositions prepared by extrusion may be in the form of granules that are applicable to different molding processes, including processes selected from extrusion molding, coextrusion molding, extrusion coating, injection molding, injection blow molding, inject stretch blow molding, thermoforming, cast film extrusion, blown film extrusion, foaming, extrusion blow-molding, injection stretched blow-molding, rotomolding, pultrusion, calendering, additive manufacturing, lamination, and the like, to produce manufactured articles.

In one or more embodiments, the article is an injection molded article, a thermoformed article, a film, a foam, a blow molded article, an additive manufactured article, a compressed article, a coextruded article, a laminated article, an injection blow molded article, a rotomolded article, an extruded article, monolayer articles, multilayer articles, or a pultruded article, and the like. In embodiments of a multilayer article, it is envisioned that at least one of the layers comprises the polymer composition of the present disclosure.

Applications

In one or more embodiments, polymer compositions may be used in the manufacturing of articles, including rigid packaging, tanks, water and gas pipes, caps, closures, injected parts, small volume blown articles, large volume blown articles, foams, expanded articles, thermoformed articles, household appliance parts (such as in a washing machine including the housing and agitator), injected articles, domestic utilities, technical parts, air ducts, automotive parts and reservoirs (such as housings for batteries and headlights and wheel well guard), transportation articles (such as pallets and boxes) cylinders, perforated coils, cisterns, water boxes, boxes, bins, garbage collector, shoulders of pipes, tubes, ropes, oriented structures, plastic furniture, battery boxes, crates, plates, sheets, tubes, pipes, containers, electronic articles, IBC (intermediate bulk container), water tank, septic tanks, and other types of tanks.

In one or more embodiments, the make-up of the blended composition, properties of the components and find blend may be selected based on the type of article being produced, such as depending on whether it is a molded article, appliance component, or cap/closure.

Molded articles may, in one or more embodiments, may use a blend of virgin polypropylene (present in an amount ranging from 20-50 wt %) and PCR (present in an amount ranging from 50-80 wt %) to have a blended polymer composition having a Melt Flow Rate with a lower limit of any of 1, 2, or 5 g/10 min to an upper limit of any of 20, 35, or 50 g/10 min measured according to ASTM D1238 (2.16 kg/230° C.) where any lower limit can be used with any upper limit; a Flexural Modulus at 1% secant measured according to ASTM D790 having a lower limit of any of 900, 950, or 1000 MPa, to an upper limit of any of 1500, 1600, or 1700 MPa where any lower limit can be used with any upper limit; and a Izod Impact Resistance at 23° C. measured according to ASTM D256 having a lower limit of any of 15, 20, or 25 J/m to an upper limit of any of 150, 200, 300, or 400 J/m, where any lower limit can be used with any upper limit.

For example, one or more embodiments relate to molded articles that may include automobile components such as batteries, wheel well guard, and which may include a combination of PCR with a heterophasic polypropylene copolymer (HECO). The HECO may have a Melt Flow Rate measured according to ASTM D1238 (2.16 kg/230° C.) ranging from 2 g/10 min to 5 g/10 min, a Flexural Modulus at 1% secant measured according to ASTM D790 of greater than 850 MPa, an Izod Impact Resistance at 23° C. measured according to ASTM D256 greater than 400 J/m, and an ethylene content ranging from 10 to 15%. The PCR may have a Melt Flow Rate measured according to ASTM D1238 (2.16 kg/230° C.) of 7-30 g/10 min, a Flexural Modulus at 1% secant measured according to ASTM D790 of greater than 900 MPa, and an Izod Impact Resistance at 23° C. measured according to ASTM D256 ranging from greater than 25 J/m. The HECO and PCR may be blended together in weight ratio ranging from 20/80 to 50/50, which allows for maximization of the PCR content in the blended composition while achieving a Melt Flow Rate measured according to ASTM D1238 (2.16 kg/230° C.) of 5-15 g/10 min, a Flexural Modulus at 1% secant measured according to ASTM D790 of greater than 900-1300 MPa, and an Izod Impact Resistance at 23° C. measured according to ASTM D256 greater than 90 J/m. However, it is also understood that a PCR content of less than 50 wt % may also be used in some embodiments.

One or more embodiments relate to molded articles that may include transportation articles such as pallets and boxes, and which may include a combination of PCR with a heterophasic polypropylene copolymer (HECO). The HECO may have a Melt Flow Rate measured according to ASTM D1238 (2.16 kg/230° C.) ranging from 2 g/10 min to 5 g/10 min, a Flexural Modulus at 1% secant measured according to ASTM D790 of greater than 850 MPa, an Izod Impact Resistance at 23° C. measured according to ASTM D256 greater than 400 J/m, and an ethylene content ranging from 10 to 15%. The PCR may have a Melt Flow Rate measured according to ASTM D1238 (2.16 kg/230° C.) of greater than 10 g/10 min, a Flexural Modulus at 1% secant measured according to ASTM D790 of greater than 1050 MPa, and an Izod Impact Resistance at 23° C. measured according to ASTM D256 ranging from greater than 25 J/m. The HECO and PCR may be blended together in weight ratio ranging from 20/80 to 50/50, which allows for maximization of the PCR content in the blended composition while achieving a Melt Flow Rate measured according to ASTM D1238 (2.16 kg/230° C.) of 5-15 g/10 min, a Flexural Modulus at 1% secant measured according to ASTM D790 of greater than 850-1300 MPa, and an Izod Impact Resistance at 23° C. measured according to ASTM D256 greater than 110 J/m. However, it is also understood that a PCR content of less than 50 wt % may also be used in some embodiments.

Appliance parts may, in one or more embodiments, may use a blend of virgin polypropylene (present in an amount ranging from 10-60 wt %) and PCR (present in an amount ranging from 40-90 wt %) to have a blended polymer composition having a Melt Flow Rate with a lower limit of any of 3, 5, or 8 g/10 min to an upper limit of any of 15, 18, or 30 g/10 min measured according to ASTM D1238 (2.16 kg/230° C.) where any lower limit can be used with any upper limit; a Flexural Modulus at 1% secant measured according to ASTM D790 having a lower limit of any of 950 or 1000 MPa, to an upper limit of any of 1200, 1300, 1400, 1500, or 1600 MPa where any lower limit can be used with any upper limit; and a Izod Impact Resistance at 23° C. measured according to ASTM D256 having a lower limit of any of 15, 20, or 25 J/m to an upper limit of any of 100, 125, or 150 J/m, where any lower limit can be used with any upper limit.

For example, one or more embodiments relate to appliance parts such as washing machine agitators, which may include a combination of PCR with a virgin polypropylene homopolymer. The virgin polypropylene homopolymer may have a Melt Flow Rate measured according to ASTM D1238 (2.16 kg/230° C.) ranging from 2 g/10 min to 4.2 g/10 min, a Flexural Modulus at 1% secant measured according to ASTM D790 of at least 1850 MPa, an Izod Impact Resistance at 23° C. measured according to ASTM D256 of at least 20 J/m, and a xylene content of less than 2 wt %. The PCR may have a Melt Flow Rate measured according to ASTM D1238 (2.16 kg/230° C.) of at least 10 g/10 min, a Flexural Modulus at 1% secant measured according to ASTM D790 of greater than 1050 MPa, and an Izod Impact Resistance at 23° C. measured according to ASTM D256 of greater than 25 J/m. The polypropylene and PCR may be blended together in weight ratio ranging from 10/90 to 60/40, which allows for maximization of the PCR content in the blended composition while achieving a Melt Flow Rate measured according to ASTM D1238 (2.16 kg/230° C.) of 7 g/10 min to 12 g/10 min, a Flexural Modulus at 1% secant measured according to ASTM D790 of greater than 1400 MPa, an Izod Impact Resistance at 23° C. measured according to ASTM D256 greater than 25 J/m. However, it is also understood that a PCR content of less than 40 wt % may also be used in some embodiments.

One or more other embodiments relate to appliance parts such as a washing machine housing, which may include a combination of PCR with a heterophasic polypropylene copolymer (HECO). The HECO may have a Melt Flow Rate measured according to ASTM D1238 (2.16 kg/230° C.) ranging from 30 g/10 min to 55 g/10 min, a Flexural Modulus at 1% secant measured according to ASTM D790 of greater than 1000 to 1400 MPa, an Izod Impact Resistance at 23° C. measured according to ASTM D256 ranging from greater than 70 J/m, and an ethylene content ranging from 6 to 10%. The PCR may have a Melt Flow Rate measured according to ASTM D1238 (2.16 kg/230° C.) of 7-30 g/10 min, a Flexural Modulus at 1% secant measured according to ASTM D790 of greater than 900 MPa, and an Izod Impact Resistance at 23° C. measured according to ASTM D256 ranging from greater than 25 J/m. The HECO and PCR may be blended together in weight ratio ranging from 10/90 to 60/40, which allows for maximization of the PCR content in the blended composition while achieving a Melt Flow Rate measured according to ASTM D1238 (2.16 kg/230° C.) of 15-30 g/10 min, a Flexural Modulus at 1% secant measured according to ASTM D790 of greater than 1100 MPa, an Izod Impact Resistance at 23° C. measured according to ASTM D256 greater than 50 J/m. However, it is also understood that a PCR content of less than 40 wt % may also be used in some embodiments.

Caps and closures may, in one or more embodiments, may use a blend of virgin polypropylene (present in an amount ranging from 10-60 wt %) and PCR (present in an amount ranging from 40-90 wt %) to have a blended polymer composition having a Melt How Rate with a lower limit of any of 5, 8, or 10 g/10 min to an upper limit of any of 20, 25, or 30 g/10 min measured according to ASTM D1238 (2.16 kg/230° C.) where any lower limit can be used with any upper limit; a Flexural Modulus at 1% secant measured according to ASTM D790 having a lower limit of any of 1000, 1050, or 1100 MPa, to an upper limit of any of 1300, 1400, or 1500 MPa where any lower limit can be used with any upper limit; and a Izod Impact Resistance at 23° C. measured according to ASTM D256 having a lower limit of any of 30, 40, or 50 J/m to an upper limit of any of 140, 160, or 180 J/m, where any lower limit can be used with any upper limit.

For example, one or more embodiments relate to caps and closures such as threaded caps or plug closures, which may include a combination of PCR with a heterophasic polypropylene copolymer (HECO). The HECO may have a Melt Flow Rate measured according to ASTM D1238 (2.16 kg/230° C.) ranging from 30 g/10 min to 55 g/10 min, a Flexural Modulus at 1% secant measured according to ASTM D790 of less than 1400 MPa, an Izod Impact Resistance at 23° C. measured according to ASTM D256 ranging from 70-100 J/m, and an ethylene content ranging from 6 to 10%. The PCR may have a Melt Flow Rate measured according to ASTM D1238 (2.16 kg/230° C.) of 7-30 g/10 min, a Flexural Modulus at 1% secant measured according to ASTM D790 of greater than 900 MPa, and an Izod Impact Resistance at 23° C. measured according to ASTM D256 ranging from greater than 25 J/m. The HECO and PCR may be blended together in weight ratio ranging from 10/90 to 60/40, which allows for maximization of the PCR content in the blended composition while achieving a Melt Flow Rate measured according to ASTM D1238 (2.16 kg/230° C.) of 15-30 g/10 min, a Flexural Modulus at 1% secant measured according to ASTM D790 of greater than 1100 MPa, an Izod Impact Resistance at 23° C. measured according to ASTM D256 greater than 45 J/m. However, it is also understood that a PCR content of less than 40 wt % may also be used in some embodiments.

One or more other embodiments relate to caps and closures such as in for chemical containers, which may include a combination of PCR with a virgin polypropylene homopolymer. The virgin polypropylene homopolymer may have a Melt Flow Rate measured according to ASTM D1238 (2.16 kg/230° C.) ranging from 2 g/10 min to 4.2 g/10 min, a Flexural Modulus at 1% secant measured according to ASTM D790 of at least 1850 MPa, and an Izod Impact Resistance at 23° C. measured according to ASTM D256 of at least 20 J/m. The PCR may have a Melt Flow Rate measured according to ASTM D1238 (2.16 kg/230° C.) of at least 10 g/10 min, a Flexural Modulus at 1% secant measured according to ASTM D790 of greater than 1050 MPa, and an Izod Impact Resistance at 23° C. measured according to ASTM D256 of greater than 25 J/m. The virgin polypropylene and PCR may be blended together in weight ratio ranging from 10/90 to 60/40, which allows for maximization of the PCR content in the blended composition while achieving a Melt Flow Rate measured according to ASTM D1238 (2.16 kg/230° C.) of 7.5 g/10 min to 12 g/10 min, a Flexural Modulus at 1% secant measured according to ASTM D790 of greater than 1350 MPa, an Izod Impact Resistance at 23° C. measured according to ASTM D256 greater than 45 J/m. However, it is also understood that a PCR content of less than 40 wt % may also be used in some embodiments.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A polymer composition, comprising:
    from 10 to 90 wt. % of at least a virgin polypropylene resin selected from a group consisting of propylene homopolymers, propylene random copolymers, propylene heterophasic copolymers and combinations thereof; and
    from 10 to 90 wt. % of at least a recycled resin;
    wherein the polymer composition presents a Melt Flow Rate from 1 to 50 g/10 min measured according to ASTM D1238 (2.16 kg/230° C.), Flexural Modulus at 1% secant measured according to ASTM D790 from 900 to 1700 MPa and a Izod Impact Resistance at 23° C. measured according to ASTM D256 from 15 to 400 J/m.

2. The polymer composition of claim 1, wherein the virgin polypropylene resin is present in an amount ranging from 10 to 50 wt. % and the recycled resin is present in an amount ranging from 40 to 90 wt. %; and
    wherein the polymer composition presents a Melt Flow Rate from 3 to 30 g/10 min measured according to ASTM D1238 (2.16 kg/230° C.), Flexural Modulus at 1% secant measured according to ASTM D790 from 950 to 1600 MPa and a Izod Impact Resistance at 23° C. measured according to ASTM D256 from 15 to 150 J/m.

3. The polymer composition of claim 1, wherein the virgin polypropylene resin is present in an amount ranging from 10 to 50 wt. % and the recycled resin is present in an amount ranging from 40 to 90 wt. %; and
   wherein the polymer composition presents a Melt Flow Rate from 5 to 30 g/10 min measured according to ASTM D1238 (2.16 kg/230° C.), Flexural Modulus at 1% secant measured according to ASTM D790 from 1000 to 1500 MPa and a Izod Impact Resistance at 23° C. measured according to ASTM D256 from 30 to 180 J/m.

4. The polymer composition of claim 1, wherein the polymer composition has a density measured according to ASTM D 792 greater than 0.850 g/cm³.

5. The polymer composition of claim 1, wherein the virgin polypropylene is a petrochemical based polypropylene, a biobased polypropylene or a combination thereof.

6. The polymer composition of claim 5, wherein the wt % of each component is selected such that the polymer composition exhibits an Emission Factor$_{Blend}$ of less than or equal to 1.0 kg $CO_2$/kg polymer composition, as determined according to the formula:

$$P1_{Biobased} \cdot \text{Emission factor}_{P1Biobased} + P2_{Recycled} \cdot \text{Emission factor}_{P2Recycled} + P3_{Petro} \cdot \text{Emission factor}_{P3Petro} = \text{Emission factor}_{blend};$$

wherein $P1_{Biobased}$ is the weight percentage of the virgin biobased polypropylene, $P2_{Recycled}$ is the weight percent of the recycled resin, $P3_{Petro}$ is the weight percent of the virgin petrochemical based polypropylene; Emission factor$_{P1Biobased}$ is the calculated emission for the virgin biobased polypropylene in kg $CO_2$/kg PP, Emission factor$_{P2Recycled}$ is the calculated emission for the recycled resin in kg $CO_2$/kg PP, Emission factor$_{P3Petro}$ is the calculated emission for the virgin petrochemical based polypropylene, and Emission factor$_{Blend}$ is the calculated emission for the polymer composition in kg $CO_2$/kg polymer composition.

7. The polymer composition of claim 6, wherein the composition has an Emission Factor$_{Blend}$ in the range of −1 to 1 g $CO_2$/kg polymer composition.

8. The polymer composition of claim 1, wherein, when a biobased polypropylene is present, the polymer composition exhibits a biobased carbon content as determined by ASTM D6866-18 Method B of at least 5%.

9. The polymer composition of claim 1, wherein the virgin polypropylene has a melt flow rate measured according to ASTM D1238 at 230° C./2.16 kg ranging from 1 to 150 g/10 min.

10. The polymer composition of claim 1, wherein the virgin polypropylene has a flexural modulus at 1% secant, measured according to ASTM D790 ranging from 650 to 1700 MPa.

11. The polymer composition of claim 1, wherein the virgin polypropylene has an Izod Impact Resistance at 23° C., measured according to ASTM D256 of at least 10 J/m.

12. The polymer composition of claim 1, wherein the propylene homopolymer comprises from 0 to 1% of at least one comonomer selected from ethylene, alpha-olefins comprising from 4 to 8 carbon atoms and combinations thereof.

13. The polymer composition of claim 1, wherein the propylene random copolymer comprises from 1 to 6 wt. % of at least one comonomer selected from ethylene, alpha-olefins comprising from 4 to 8 carbon atoms and combinations thereof.

14. The polymer composition of claim 1, wherein the propylene heterophasic copolymer comprises:

a continuous phase selected from propylene homopolymers and propylene random copolymers comprising from 0 to 6 wt. % of a comonomer selected from ethylene, alpha-olefins having from 4 to 8 carbon atoms and combinations thereof; and a dispersed rubber phase at an amount ranging from 10 to 40 wt % of the propylene heterophasic copolymer, wherein the dispersed rubber phase comprises from 20 to 70 wt. % of a comonomer selected from ethylene, alpha-olefins having from 4 to 8 carbon atoms and combinations thereof, having an intrinsic viscosity from 0.5 to 7.0 dl/g measured according ASTM D445 in decaline at 135° C.;

wherein the propylene heterophasic copolymer has from 10 to 40 wt. % of xylene cold solubles measured according to ASTM D5492, and a comonomer content ranging from 3 to 30 wt % of a total comonomers content.

15. The polymer composition of claim 1, wherein the recycled resin comprises a post-consumer resin (PCR) and wherein at least 80 wt % of the PCR comprises polyolefins selected from polyethylenes, polypropylenes, polybutylenes, and polystyrene.

16. The polymer composition of claim 1, wherein the recycled resin comprises a post-consumer resin (PCR) and wherein at least 80 wt % of the PCR comprises polypropylene.

17. The polymer composition of claim 1, further comprising at least 100 ppm of at least an antioxidant selected from tetrakis(methylene(3,5-di-tert-butyl-4-hydroxy-hydrocinnamate))methane, 1,3,5-Trimethyl-2,4,6-tris(3,5-di-tert-butyl-4-hydroxybenzyl) Benzene, Tris(2,4-di-tert-butylphenyl)phosphite, Bis(2,4-di-t-butylphenyl) Pentaerythrtol Diphosphite, Ditridecyl thiodipropionate, Oxidized bis (hydrogenated tallow alkyl) amines, Pentaerythrityl-tetrakis(3-(3',5'-di-tert-butyl-4-hydroxyphenyl)-propionate; 1,3,5-trimethyl-2,4,6-tris-(3,5-di-tert butyl-4-hydroxyphenyl) benzene, 1,3,5-Tris(3',5'-di-tert-butyl-4'-hydroxybenzyl)-isocyanurate), Di-stearyl-thio-di-propionate, Di-lauryl-thio-di-propionate; Di-octadecyl-disulphide, Pentaerithrityl-tetrakis(3-(3',5'-di-tert-butyl-4'-hydroxyphenyl)-propionate), Octadecyl-3-(3',5'-ditert-butyl-4-hydroxyphenyl)-propionate), Bis(2,4-di-tert-butylphenyl)-pentaerithrityl-di-phosphite, Tetrakis[methylene-3-(3',5'-di-t-4-hydroxyphenyl) propionate]methane, n-octadecynyl-3-(4'-hydroxynyl)propionate, and combinations thereof.

18. The polymer composition of claim 1, further comprising: at least 50 ppm of at least a neutralizing agent selected from stearates or magnesium aluminum hydroxyl carbonate hydrates.

19. A method for preparing a molded article, the method comprising:
   dry blending or melt blending the recycled resin and the virgin polypropylene resin selected from polypropylene homopolymers, polypropylene random copolymers, polypropylene heterophasic copolymers or combinations thereof to form the polymer composition of claim 1; and
   molding the article from the polymer composition.

20. The method of claim 19, wherein the molding is selected from extrusion blow molding, injection blow molding, injection molding, thermoforming and foam blow molding.

21. A molded article comprising the polymeric composition according to claim 1, wherein the molded article is selected from pallets, boxes, appliance parts, appliance housing, automotive parts, batteries, wheel well guards, caps and closures.

* * * * *